(12) United States Patent
Wu

(10) Patent No.: US 6,910,880 B2
(45) Date of Patent: Jun. 28, 2005

(54) IGNITION CONTROLLER OF BARBECUE GRILL

(75) Inventor: Sen-Yu Wu, Taichung Hsien (TW)

(73) Assignee: Seven Universe Industrial Co., Ltd., Taichung (TW)

( * ) Notice: Subject to any disclaimer, the term of this patent is extended or adjusted under 35 U.S.C. 154(b) by 0 days.

(21) Appl. No.: 10/716,491

(22) Filed: Nov. 20, 2003

(65) Prior Publication Data

US 2005/0112519 A1    May 26, 2005

(51) Int. Cl.[7] .................................................. F23Q 7/12
(52) U.S. Cl. ...................... 431/256; 431/254; 126/39 R
(58) Field of Search ................................ 431/256, 254; 123/39 R, 25 B

(56) References Cited

U.S. PATENT DOCUMENTS 4,662,349 A  *  5/1987 McKenzie et al. ......... 126/41 R
5,213,075 A  *  5/1993 Stephen et al. ........... 126/25 B
6,352,428 B1 *  3/2002 Uribetxebarria et al. ...... 431/80
6,571,829 B2 *  6/2003 Kuriyama et al. ....... 137/630.2

* cited by examiner

Primary Examiner—Alfred Basichas
(74) Attorney, Agent, or Firm—Troxell Law Office, PLLC

(57) ABSTRACT

An ignition controller has a pressure controller having a housing with a first inlet and a first outlet, an ignition adjustor having a housing with a second inlet and a second outlet and an adjusting assembly. The second outlet is connected to the second inlet and the second inlet is connected to the first outlet of the pressure controller and the adjusting assembly is movably mounted to the housing to adjust the gas flow rate in the second outlet. The ignition controller is mounted on a barbecue grill with the first inlet connected to a gas supply and the second outlet connected to a burner member whereby the gas flow has a stable pressure and the gas flow rate is precisely adjusted.

4 Claims, 4 Drawing Sheets

IGNITION CONTROLLER OF BARBECUE GRILL

BACKGROUND OF THE INVENTION

1. Field of the Invention

The present invention relates generally to a stove, and more particularly to an ignition controller of a barbecue grill.

2. Description of the Related Art

A conventional stove has a case body and a metal net mounted on the case body. Charcoals are put in the case body under the net and burn to barbecue steaks and other foods that are put on the net. The ashes, smoke and suspended particles of the charcoals after burning always contaminate foods and people might get sick, if he/she ate the barbecued foods. To solve this problem, there were barbecue grills presented to barbecue food by burning gas.

FIG. 1 hows a conventional barbecue grill 100 having a case body 102, a gas controller 104 mounted on the case body 102 and a burner member (not shown) mounted in the case body 102 under a net 106. The burner member is connected to the gas controller 104 and the gas controller 104 is connected to a gas supply (not shown), such that gas is provided to the burner member for burning and the gas controller 104 is to control the gas flow. Such barbecue grill has no ignition controller, so user has to put some fire on the burner assemble for ignition and that is very inconvenient and dangerous.

FIG. 2 and FIG. 3 show the structure of the conventional gas controller 104, which has a housing 108 with an inlet 110 connected to the gas supply and an outlet 112 connected to the burner member, a knob 114 on a top of the housing 108, a block 116, a spring 118 and a film 120. The knob 114 is turned to move the block 108 up or down and to force the spring 118 moving the film 120 whereby the pressure and flow rate of the gas, which flows out of the outlet 112, are changed. In other words, the locations of the film 120 control the pressure and flow rate of the gas. The conventional gas controller 104 might have unstable output while there is unstable gas supply, because that the spring 118 is free for compression and extension.

There was a barbecue grill, which is similar to aforesaid barbecue grill 100, except that an ignition controller is provided for ignition. The ignition controller is either a knob or a button. Such barbecue grill still has the gas controller 104 as described above to adjust the gas flow, so that it still has the same problem as the aforesaid barbecue grill 100 has.

SUMMARY OF THE INVENTION

The primary objective of the present invention is to provide an ignition controller for a barbecue grill, which makes the barbecue grill having a stable pressure of gas flow that makes the gas burning well.

The secondary objective of the present invention is to provide an ignition controller for a barbecue grill, which can adjust the gas flow to control the flame.

According to the objectives of the present invention, a ignition controller for a barbecue grill comprises a pressure controller having a housing with a first inlet and a first outlet, wherein a gas flow flows into the housing via the first inlet and flows out of the housing via the first outlet, and an ignition adjustor having a housing with a second inlet and a second outlet and an adjusting assembly, wherein the second outlet is connected to the second inlet and the second inlet is connected to the first outlet of the pressure controller and the adjusting assembly is movably mounted to the housing to adjust the gas flow rate in the second outlet. The ignition controller is mounted on the barbecue grill with the first inlet connected to a gas supply and the second outlet connected to a burner member whereby the gas flow has a stable pressure and the gas flow rate is precisely adjusted.

DETAILED DESCRIPTION OF THE INVENTION

Figure 1:
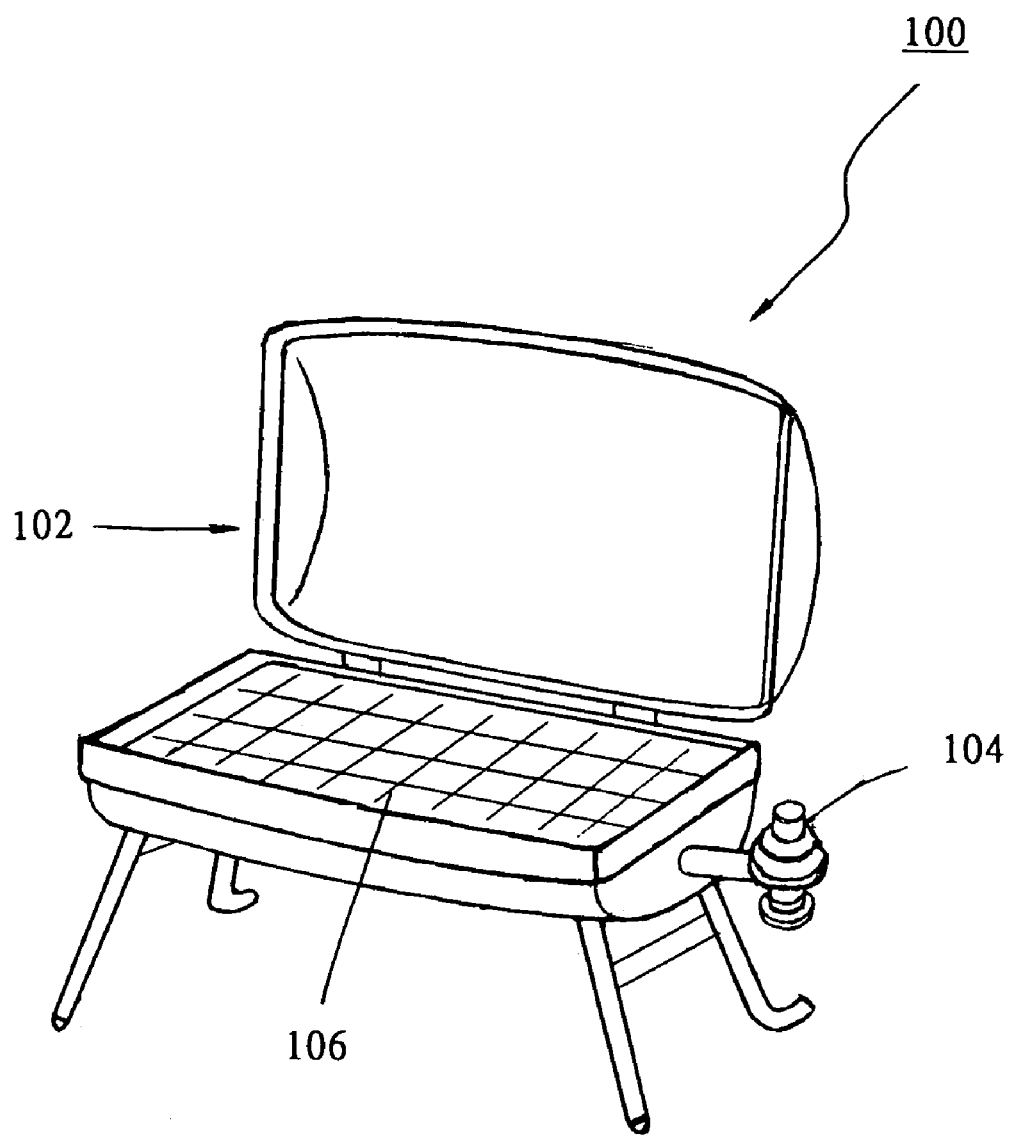
FIG. 1 is a perspective view of a conventional barbecue grill.
Figure 2:
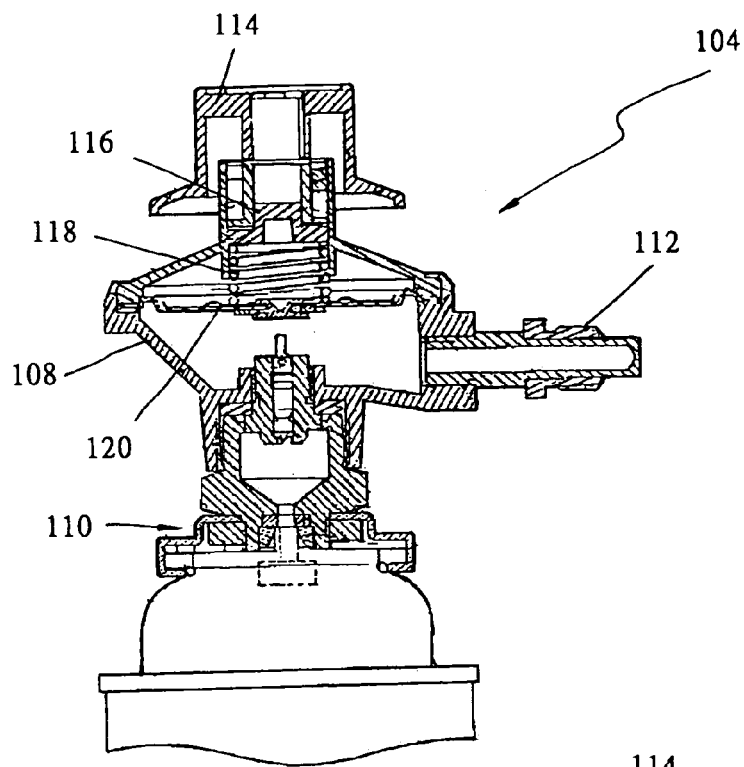
FIG. 2 is a sectional view of the gas controller of the conventional barbecue grill, showing the knob being screwed upwards.
Figure 3:
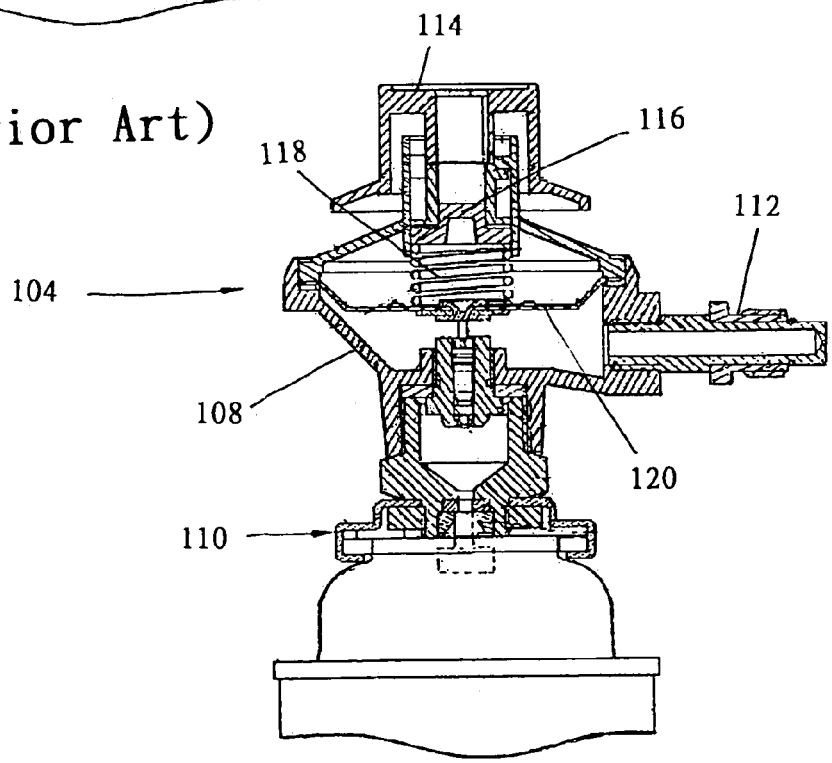
FIG. 3 is a sectional view of the gas controller of the conventional barbecue grill, showing the knob being screwed downwards.
Figure 4:
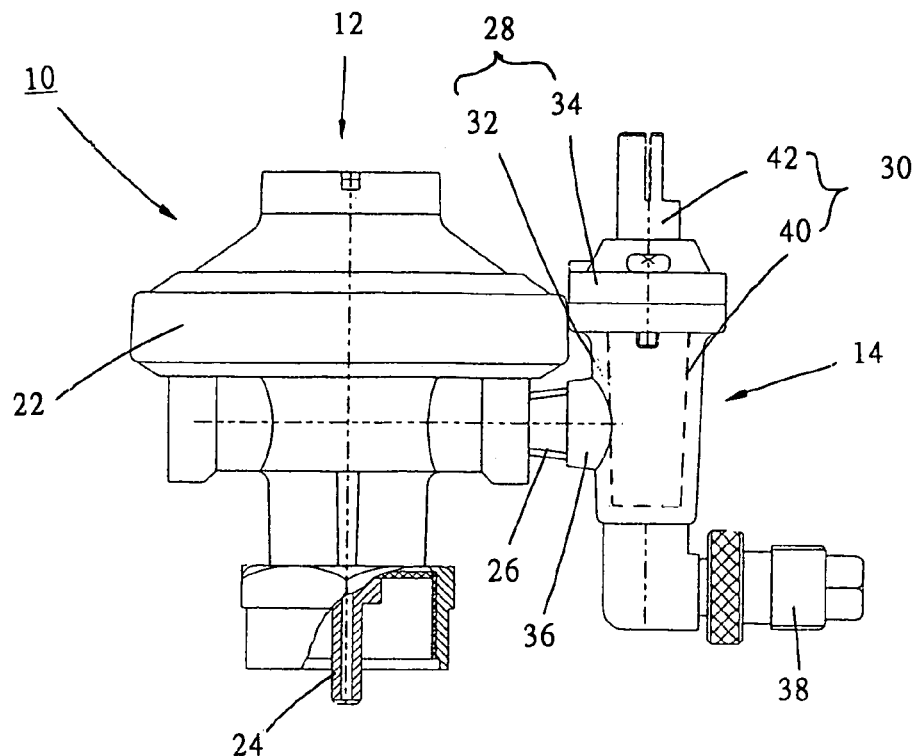
FIG. 4 is a lateral view of a first preferred embodiment of the present invention.

As shown in FIG. 4, an ignition controller 10 of the first preferred embodiment has a pressure controller 12 and an ignition adjustor 14. The pressure controller 12 is as same as the prior art, which input the gas and output the gas with a predetermined pressure. The pressure controller 12 has a housing 22 with a first inlet 24 and a first outlet 26, wherein the gas flow into the housing 22 via the first inlet 24 and flow out of the housing 22 via the first outlet 26. The rest components of the pressure controller 12 are similar to the gas controller as described above, so I would not describe the detail here. The ignition adjustor 14 has a housing 28 and an adjusting assembly 30. The housing 28 consists of a box 32 and a cover 34, wherein the box 32 has a second inlet 36 and a second outlet 38 connected to each other and the adjusting assembly 30 consists of a close member 40 and a screw bar set 42 mounted in the housing 40. The close member 40 and the screw bar set 42 are as same as the components of a conventional gas switch. The screw bar set 42 has a portion left out of the housing 28 to be turned to rotate the close member 40, such that the gas flow rate in the second outlet is controlled precisely.

The ignition controller 10 of the present invention is mounted to a case of a barbecue grill directly, wherein the first inlet 24 is connected to a gas supply (such as a gas barrel or a gas can) and the second outlet 38 is connected to a burner member (such as burners, burner tubes or infrared rays burner but not shown in FIG.). The pressure controller 12 provides gas flow with a stable pressure to the ignition adjustor 14 so that the burner member will have the gas flow with very stable pressure and the gas burn well on the burner member. The ignition adjustor 14 can adjust the gas flow by turning the screw bar set 42 so that the flames of the burner assembly are adjusted precisely.

Figure 5:
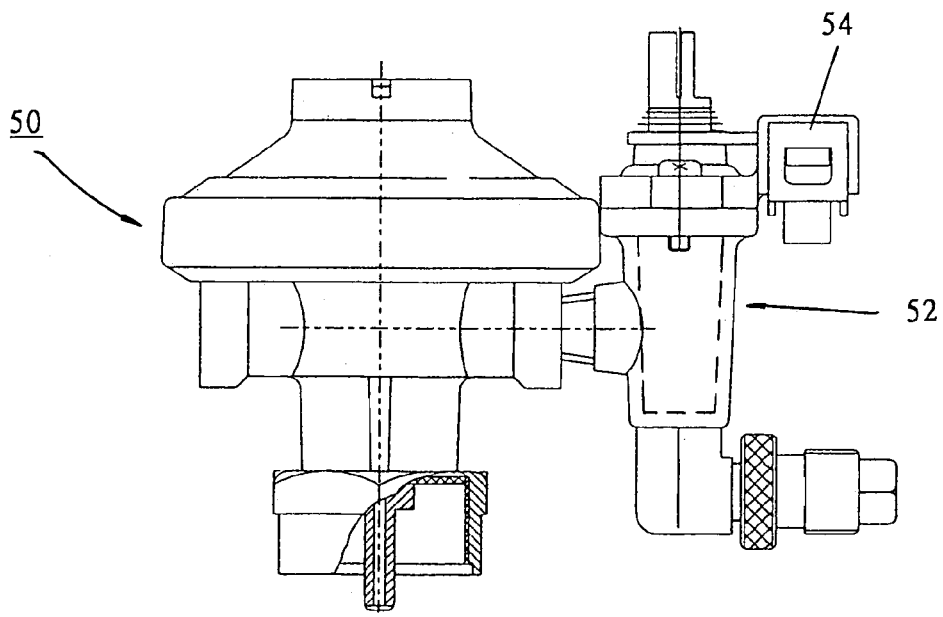
FIG. 5 is a lateral view of a second preferred embodiment of the present invention.

FIG. 5 shows an ignition controller 50 of the second preferred embodiment of the present invention, which is similar to the ignition controller 10 of the first preferred embodiment, except that a conventional ignition assembly 54 of a gas switch is provided. The ignition assembly 54 has both functions of providing a gas flow with a stable pressure and adjusting the gas flow, except that the ignition assembly 54 further has a function of igniting the gas directly.

Figure 6:
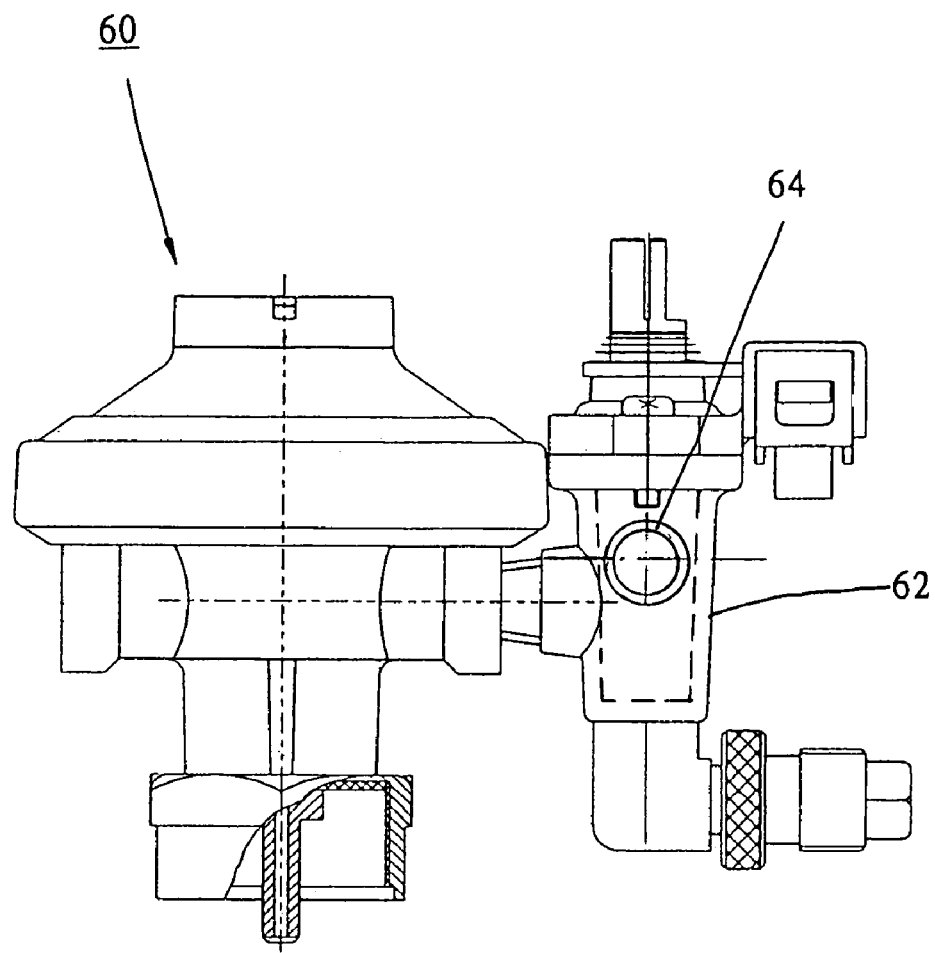
FIG. 6 is a lateral view of a third preferred embodiment of the present invention.

FIG. 6 shows an ignition controller 60 of the third preferred embodiment of the present invention, which further provides a flame output 64 and that is as same as the conventional stove used in kitchen.

In conclusion, the present invention provides the pressure controller and the ignition adjustor in a single unit with which the gas flow has a stable pressure and the flow rate can be adjusted precisely so that the barbecue grill has stable flames and the flame are adjustable. The present invention further provides the ignition assembly in the ignition adjustor for ignition directly.

What is claimed is:

1. An ignition controller for a barbecue grill, comprising:
   a pressure controller having a housing with a first inlet and a first outlet, wherein a gas flow flows into the housing via the first inlet and flows out of the housing via the first outlet, and
   an ignition adjustor having a housing with a second inlet and a second outlet and an adjusting assembly, wherein the second outlet is connected to the second inlet and the second inlet is connected to the first outlet of the pressure controller and the adjusting assembly is movably mounted to the housing to adjust the gas flow rate in the second outlet;
   wherein the ignition controller is mounted on the barbecue grill with the first inlet connected to a gas supply and the second outlet connected to a burner member whereby the gas flow has a stable pressure and the gas flow rate is precisely adjusted.

2. The ignition controller as defined in claim 1, wherein the housing of the ignition adjustor has a box and a cover coupled with each other and the adjusting assembly is mounted in the housing.

3. The ignition controller as defined in claim 2, wherein the ignition adjustor further has an ignition assembly.

4. The ignition controller as defined in claim 2, wherein the box of the housing of the ignition adjustor further has a flame output.

* * * * *